Figure 1:
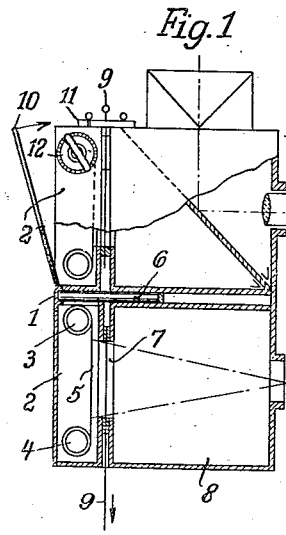

June 17, 1941.  C. RAUCH  2,245,606
ROLL-FILM CAMERA
Filed May 18, 1938  2 Sheets-Sheet 1

Inventor:
Curt Rauch
By Watson, Cole, Grindle & Watson
Attorneys.

June 17, 1941.  C. RAUCH  2,245,606
ROLL-FILM CAMERA
Filed May 18, 1938  2 Sheets-Sheet 2
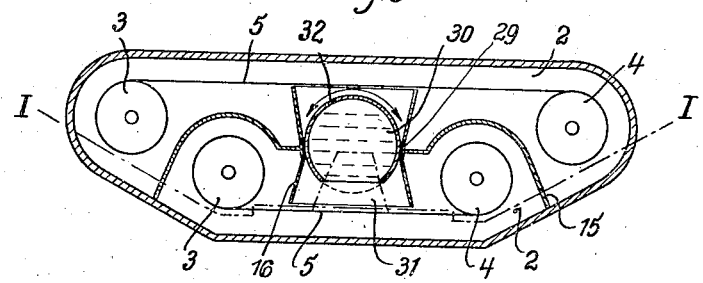
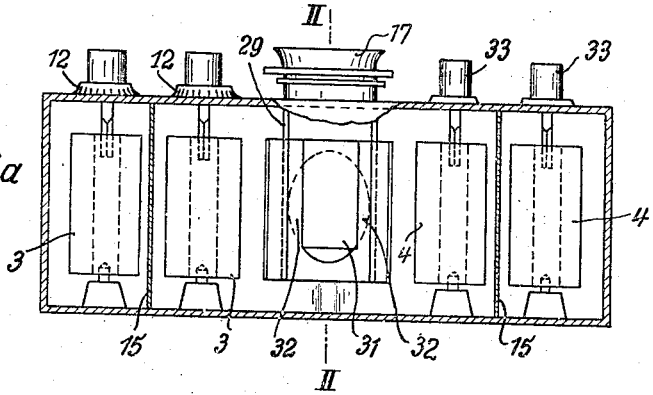
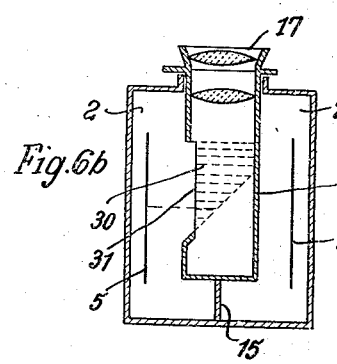
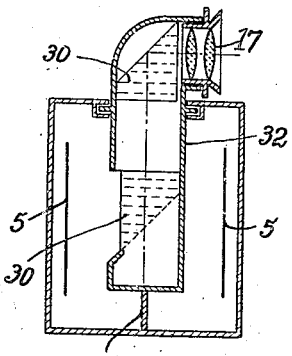
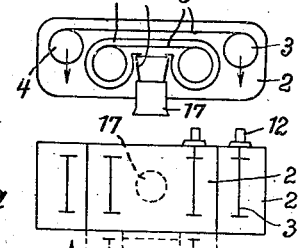
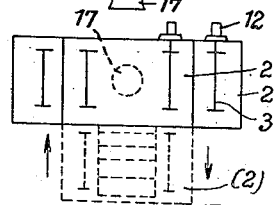
Inventor:
Curt Rauch
By
Watson, Cole, Grindle & Watson
Attorneys.

Patented June 17, 1941

2,245,606

UNITED STATES PATENT OFFICE 2,245,606

ROLL-FILM CAMERA

Curt Rauch, Chemnitz, Saxony, Germany

Application May 18, 1938, Serial No. 208,655
In Germany May 20, 1937

3 Claims. (Cl. 95—31)

This invention relates to a roll-film camera provided with a device for the alternate exposure of film materials with different sensitive layers. With the known roll-film cameras of this type a plurality of film spools is arranged in a circle on a drum-like member and each of these film spools can be moved within said drum into a certain definite position which is the only one in which it can be brought into engagement with a winding-up drum. This known arrangement suffers from the drawback that always only one spool, or the film wound upon it respectively, can be wound off by the drum, whereas in the case of a change of the film material prior to making use of the film concerned the film wound up prior thereto must be re-wound. This disadvantage is obviated by the present invention.

In roll-film cameras of the type in question the films are, according to the present invention, arranged separately in shuttable compartments of a space united with the camera, and when being moved into the exposing position, or into the axis of exposure respectively, the films remain in engagement with their winding-on spools and their winding-off spools within said compartments. The preparedness of the films for exposures can be effected, according to one constructional form of the invention, by varying the position of the lens system, or of this system together with its carrier respectively, relatively to the film compartment, the other film portions not in preparedness for exposures being shut off from the access of light. The invention presents constructional forms in which the compartments provided for the reception of the films lie one over the other or are the one enclosed within the other, but it is likewise possible that they contact with one another at one of their flat sides.

In the first of these cases the arrangement can, according to this invention, be so designed that the films lie expanded between the spools with their back sides opposite one another and that the lens system is attachable to a recess which can be opened and is provided in that wall of each of the film compartments which lies opposite the sensitive side of the exposure material. If, according to a modification of this arrangement, the films are so located that the sensitive faces lie opposite one another, the ray of light effecting the exposure is directed onto the film to be used by optical means. This optical means is then so designed as to permit adjustment into several positions and to shut off at the same time the films not to be exposed; it can consist of a prism or mirror adjusted to the axis of exposure and being screened, except the sides where the light enters and where it leaves said member, and being, furthermore, complemented at its screened part by attached members by which the prism is transformed into a cylinder, the arrangement being such that this cylinder is rotatably supported within the walls separating the compartments from one another.

There may be provided, according to another modification, two such prisms or mirrors complemented to a cylinder and being screened except the sides where the light enters into and leaves the cylinders, the arrangement in all other respects being the same as otherwise, except that the lens system is coupled with the cylinder at that end where the light enters into it and is rotatory with it around the same axis in the direction of the exposure.

If, as has already been mentioned in a preceding part of this specification, the compartments lie flat side by side, the lens set is arranged adjustably in front of the film along a shifting path that is to be exposed, and on that path it can take along with it the shutting-off body, for instance a slide or a Venetian blind, serving for shutting that film compartment not being in the exposing position at the time being.

Likewise in accordance with this invention a modification very suited for the purpose in view consists therein that the film containers are designed in the form of rotatory disks, the compartments of which can be brought into engagement with the camera in any desired succession. If there are two compartments designed in the manner of rotatory disks, as mentioned, each thereof can be turned off.

There is furthermore a construction form falling within the scope of this invention in which each of the films housed in compartments lying side by side can be guided in loop-shape over a roll, the position of which is variable within guides and which places the film pertaining to it and being led into preparedness for an exposure against the end of a light shaft. The rolls guiding the loops at the time being take then along with them a Venetian blind which prevents light from entering into said shaft through the respective film. This arrangement can be modified in this way that instead of the special roll guiding the film in the form of a loop one of the film spools may be shiftably arranged in an appropriate manner.

Further characteristic features of the invention will be disclosed in the following detailed description.

Figure 1A:
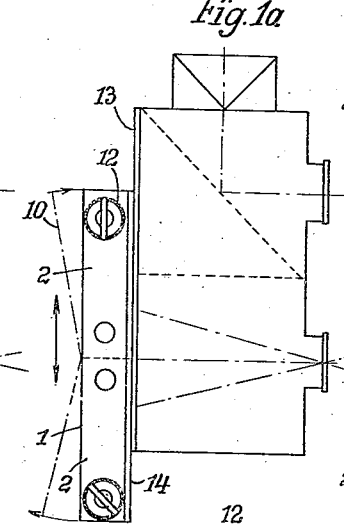
Figure 1B:
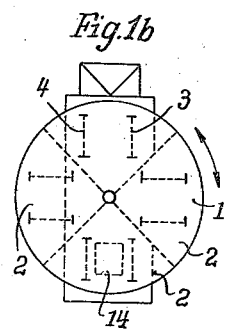
Figure 1C:

The invention is illustrated diagrammatically and by way of example on the accompanying drawings on which Figure 1 is a vertical section through one of the several constructional forms of the invention. Figure 1a is a side-view of a modification. Figure 1b is likewise a side-view of a modification. Figure 1c is another side-view of a modification, and the Figures 2, 3, 4, 5, 5a, 6, 6a, 6b, 7, 8 and 8a are sections through further constructional forms, each of which is fully described hereinafter.

In the Figs. 1, 1a and 1b the invention is applied to a reflex camera. 1 denotes a space united with the camera and subdivided into chambers 2. In Figs. 1 and 1a there are two such compartments, whereas in Fig. 1b there are four thereof; in each of them is a film 5 on spools 3 and 4, each film having a separate sensitive layer. In Fig. 1 the space 1 is turnable at the rear side of the camera on the bolt 6 and can be brought into communication with the individual compartments at the window 7 of the camera proper 8 whereafter a slide 9 can establish the opening of the respective compartment. The films can be introduced at the rear through flap doors 10 which can be secured in position by a swivel 11 or an equivalent member attached to the camera at a suitable place. One of the two spools pertaining to a film is connected with a counting device provided for the sake of a control. In Fig. 1a the space 1 is not turnable, but can be vertically shifted in a guide 13. In Fig. 1b said space is designed as a drum which is turnable on a base plate 14 in which a window is provided so that the compartments can be light-tight closed without any separate shutting means, for instance such as the above-mentioned slide 9.

In Fig. 1c the space or body subdivided into compartments 2 is turnable on a hinge-pin 6 whereby it is rendered possible to turn the unengaged space or body against the bottom of the camera 8, in which position it may be fixed by any suitable means.

Figure 2:

In Fig. 2 the compartments are shown in transverse section; they are separated from one another by a partition wall 15. The films 5 run over the spools 3 and 4. 16 denotes light-shafts which extend to the front side of the films and prevent a distribution of undesired light. The lens system 17 is adjustable in the direction indicated by the arrow 18 and can be brought into operative position relatively to every light-shaft, or to the appertaining opening respectively. 19 denotes shutting members which are controlled by the lens system and are movable together with it in a guide 20 and shut those compartments which are not used at the time being.

Figure 3:
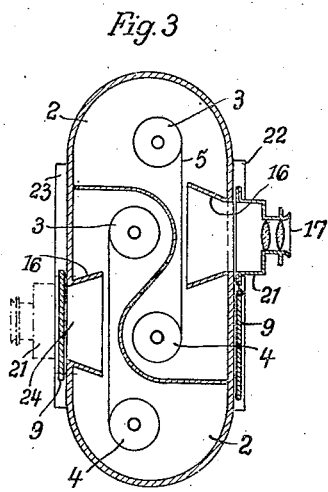

Fig. 3 can be regarded as a transverse section, as well as a longitudinal section of the respective constructional form. In this constructional form the compartments 2 superpose one another and engage one another in a certain measure, as shown. The films 5 run again past light-shafts 16. The lens system 17 can be withdrawn from the one side of the camera and transplaced to the other side of the same. In the example in question the lens system can be transplaced together with its carrier or support 21 which slides in guides 22 and 23 provided on the front face and on the rear surface of the camera. The support 21 is combined with a slide 9 which closes on the left-hand side the aperture of the light-shaft 24. When the lens set carrier has been transplaced to the other or front side of the camera, it slides in the guide 22, as shown in Fig. 3, in which the lens system is in engagement with the light-shaft 16 on the right-hand side of the camera.

Figure 4:
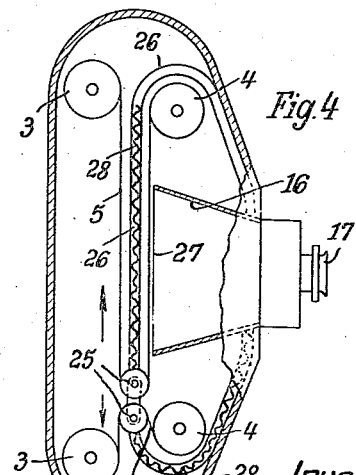

In the constructional form illustrated in Fig. 4 the two films run not only over their normal spools 3 and 4, but also over rolls 25 which are shiftable in a guide 26 provided at the wall of the camera and serve to carry the films alternately to, and in front of, the edge or rim 27 of the light-shaft 16. Each of the two rolls 25 is connected with a screening member 28, of which that just in operation lies behind the film to be exposed and protects the returning portion of the loop, as well as the entire other space from an undesired entrance of light.

Figure 5:
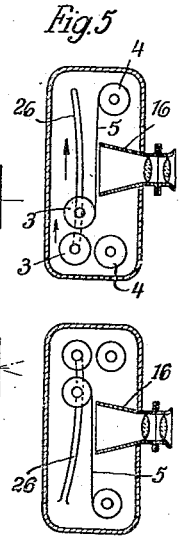
Figure 5A:
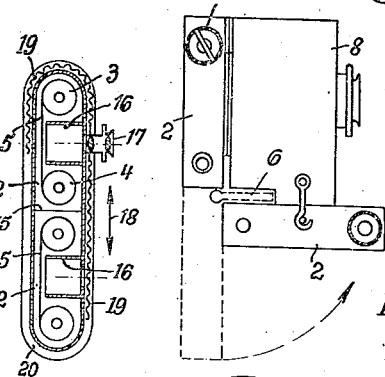

The constructional form shown in Figs. 5 and 5a is of a similar design. Such rolls as 25 in Fig. 4 are, however, dispensed with. Instead thereof, one spool of each pair of spools, for instance the spool 3, is vertically shiftable in a guide 26, and according to whether the one or the other spool 3 has been shifted upwardly, to the upper end of said guide, the one or the other film will be placed in front of the free rim of the light-shaft 16, whereas the film not in such a position at the time being is completely wound upon the two spools pertaining to it. In Fig. 5 the upper film is in the position ready for use, and in Fig. 5a it is the lower film which is in operative position.

The next constructional form to be described by way of example is illustrated in Fig. 6 in horizontal section in Fig. 6a in vertical longitudinal section, and in Fig. 6b in transverse section. In this example there are again two compartments which superpose one another. 2 denotes the two chambers which interengage in the manner shown and are separated from one another by a correspondingly shaped wall 15. Each of the two films 5 is expanded between rolls 3 and 4, and they are so arranged relatively to one another that their sensitive surfaces lie opposite to one another. In the wall 15 is supported an optical set forming a unity together with the lens system 17 and able to assume several positions relatively to the two chambers 2 when the system 17 is suitably turned. It is thereby possible to direct the incident light through the optical members either onto the one film or onto the other one. All those members of the optical set which do not serve for the light entering into, or leaving, the camera are screened, the optical members comprise a cylindrical prism 30, the side 31 of which where the light escapes is flattened. In order to obtain light-tight closure of said members when they are rotated, tightening ledges 29 are provided at the adjoining edges of the wall 15. The shape of the screening members 32 may be such that the entire optical set through which the ray of light passes forms a cylinder, except at the side where the light leaves said set. The spools 3 are those upon which the films are wound, and they are coupled with a counting mechanism 12. The spools 4 can simply be turned by means of knobs 33 and receive the exposed films when these are re-wound.

Figure 6a is a section in the line I—I of Fig. 6, and Fig. 6b is a section in the line II of Fig. 6a. The positions of the several members relatively to one another appear perfectly distinctly from these sections.

Figure 7 is a representation similar to Fig. 6b, but there is this difference that there are two prisms which constitute together a cylindrical body which is screened, except on the sides where the rays of light enter into, and leave, said body. At the upper end of the said cylindrical body the lens system 17 is again attached in such a manner that the cylindrical body can be turned together with the lens system so that exposures can be made in the same manner as described with respect to Figs. 6, 6a and 6b.

In the Figures 8 and 8a is a shown a horizontal section and a vertical section through still another example in which the compartments interengage one another similar to Fig. 6, but the inner compartment 2 can be pressed outwardly in downward direction, as indicated in dotted lines in Fig. 8a, so that it can be designed as a dark slide. When this latter is in its lower position, the spools 3 and 4 of the film enclosed in the upper compartment are moved in the direction indicated by the arrows so that the appertaining film assumes the position of the depressed film (5). At the same time the appertaining slides (not shown) are likewise moved, in the same direction, so that the lowered dark slide is light-tight separated from the exposing space. The spools 3 are also in this case coupled with counting devices.

I wish it to be understood that the invention is not restricted to the various constructional forms shown and described merely by way of example, but many further designs are possible within the scope of the invention. Besides, marks from which appears which material the individual compartments etc. contain may be provided at the spools, at the film compartments, at the camera itself, and so on, and such or similar marks can also indicate whether or not a film is in the exposing position. The feed member for a film in this position can be coupled with a shutter-winding up mechanism in order to obviate double exposure. In order to secure material which is in its position of rest against unintended movements, locking devices may be provided, for instance such which clamp the spools or the films fast in the position they occupy at the time being.

I claim:

1. A photographic roll film camera adapted for selective exposure of film frames from a plurality of rolls of film of different characteristics carried by said camera, said camera comprising in combination a main light-tight casing, provided with an optical exposure system, an auxiliary flat compact light-tight casing movably secured to said main casing at the rear thereof and disposed flatwise, parallel with and containing the focal plane of said system, said auxiliary casing being subdivided into at least two separate light-tight compartments, film spools rotatably disposed within each of said compartments, one upon each side of the axis of said optical exposure system when in operative position, the axes of the spools in each compartment being parallel with each other and occupying a plane parallel with said focal plane, one of said spools adapted to carry unexposed portions of the film and the spool on the opposite side of said axis adapted to carry the exposed portions thereof, the portion of the film in position to be exposed extending between the spools across said axis and occupying said focal plane, means for moving said auxiliary casing upon the rear of said main casing so that one or another of said compartments may be selectively disposed in operative image receiving relationship with respect to said optical exposure system, means for protecting the inoperatively positioned film roll against exposure to light while the selected film roll is in operative position, and closure means for each of said compartments for inserting and removing said spools.

2. A photographic roll film camera adapted for selective exposure of film frames from a plurality of rolls of film of different characteristics carried by said camera, said camera comprising in combination a main light-tight casing provided with an optical exposure system, an auxiliary flat compact light-tight casing rotatably pivoted upon said main casing at the rear thereof and disposed flatwise parallel with and containing the focal plane of said system, said auxiliary casing being subdivided into at least two separate light-tight compartments, film spools rotatably disposed within each of said compartments, one upon each side of the axis of said optical exposure system when in operative position, the axes of the spools in each compartment being parallel with each other and occupying a plane parallel with said focal plane, one of said spools adapted to carry unexposed portions of the film and the spool on the opposite side of said axis adapted to carry the exposed portions thereof, the portion of the film in position to be exposed extending between the spools across said axis and occupying said focal plane, means for rotating said auxiliary casing about its pivot upon the rear of said main casing so that one or another of said compartments may be selectively disposed in operative image receiving relationship with respect to said optical exposure system, means for protecting the inoperatively positioned film roll against exposure to light while the selected film roll is in operative position, and closure means for each of said compartments for inserting and removing said spools, counting mechanism on each of said compartments and accessible from the exterior of said auxiliary casing, each of said counting mechanism being operatively connected with one of said spools for indicating the number of exposures which have been made, whereby after an exposure of a frame upon one film roll, a frame may be exposed upon another of said rolls, and then the next subsequent frame on said first named roll brought into position and exposed.

3. A box-like photographic roll film camera adapted for selective exposure of film frames from a plurality of rolls of film of different characteristics carried by said camera, said camera comprising in combination a main light-tight casing having two adjacent compartments, one of said compartments being provided with an optical exposure system, the other of said compartments provided with a finder system, an auxiliary flat compact light-tight casing, said auxiliary casing being of substantially the same cross sectional area as said main casing and normally in registry therewith to provide a compact symmetrical camera, said auxiliary casing being subdivided into two light-tight compartments, film carrier members rotatably disposed within each of said compartments, one upon each side of the axis of said optical exposure system when in operative position, one of said members adapted to carry unexposed portions of the film and the member on the opposite side of the axis adapted to carry the exposed portions thereof, the portion of the film in position to be exposed being stretched between the carriers across said axis, means for rotating said auxiliary casing about its pivot upon said main casing so that one or another of said compartments may be selectively disposed in operative image receiving relationship with respect to said optical exposure system, while the other of said compartments is disposed in inoperative position adjacent the finder compartment of said main casing, and means for protecting the inoperative positioned film roll against exposure to light while the selected film roll is in operative position.

CURT RAUCH.